(12) United States Patent
Fora et al.

(10) Patent No.: US 11,860,887 B2
(45) Date of Patent: Jan. 2, 2024

(54) SCALABLE REAL-TIME ANALYTICS

(71) Applicant: KING.COM LIMITED, St. Julians (MT)

(72) Inventors: Gyula Fora, Stockholm (SE); Mattias Andersson, Stockholm (SE); Magnus Ramstedt, Stockholm (SE); Jonathan Beck, Stockholm (SE); Jakob Sultan Ericsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 148 days.

(21) Appl. No.: 15/475,913

(22) Filed: Mar. 31, 2017

(65) Prior Publication Data

US 2017/0322986 A1    Nov. 9, 2017

(30) Foreign Application Priority Data

May 4, 2016 (GB) ..................................... 1607825

(51) Int. Cl.
| | | |
|---|---|---|
| G06F 16/25 | (2019.01) | |
| G06F 16/2455 | (2019.01) | |
| A63F 13/35 | (2014.01) | |
| A63F 13/75 | (2014.01) | |
| A63F 13/61 | (2014.01) | |
| G06Q 30/0201 | (2023.01) | |

(52) U.S. Cl.
CPC ............ *G06F 16/254* (2019.01); *A63F 13/35* (2014.09); *A63F 13/61* (2014.09); *A63F 13/75* (2014.09); *G06F 16/24568* (2019.01); *G06Q 30/0201* (2013.01)

(58) Field of Classification Search
CPC .. G06F 16/254; G06F 16/24568; A63F 13/35; A63F 13/61; A63F 13/75; G06Q 30/0201
See application file for complete search history.

(56) References Cited

U.S. PATENT DOCUMENTS

| | | | | |
|---|---|---|---|---|
| 8,997,081 B1* | 3/2015 | Manion | ..................... | G06F 8/65 |
| | | | | 717/168 |
| 2009/0150319 A1* | 6/2009 | Matson | .................. | G06Q 10/06 |
| | | | | 706/47 |
| 2010/0069155 A1* | 3/2010 | Schwartz | ................ | G07F 17/32 |
| | | | | 463/42 |
| 2011/0093519 A1 | 4/2011 | Carricarte et al. | | |

(Continued)

FOREIGN PATENT DOCUMENTS

| | | |
|---|---|---|
| CN | 103502986 A | 1/2014 |
| CN | 103858096 A | 6/2014 |

(Continued)

OTHER PUBLICATIONS

International Search Report, dated Aug. 11, 2017, and Written Opinion issued in corresponding PCT Application No. PCT/EP2017/060728.

*Primary Examiner* — Hosain T Alam
*Assistant Examiner* — Anthony G Gemignani
(74) *Attorney, Agent, or Firm* — Saul Ewing LLP

(57) ABSTRACT

A computer device receives a stream of event data which event data has the data about the event itself and a device or user identifier. One or the events is stored for different identifiers to be used as state. Two or more different scripts are run and the information about at least one event is shared by at least two different scripts.

17 Claims, 11 Drawing Sheets

(56) References Cited

U.S. PATENT DOCUMENTS

| | | | |
|---|---|---|---|
| 2012/0078868 A1* | 3/2012 | Chen | G06F 16/24568 |
| | | | 707/706 |
| 2013/0019023 A1* | 1/2013 | Hemed | H04L 43/50 |
| | | | 709/231 |
| 2014/0073420 A1 | 3/2014 | Matthew | |
| 2014/0304295 A1 | 10/2014 | Eriksson et al. | |
| 2016/0001187 A1* | 1/2016 | Sepulveda | A63F 13/77 |
| | | | 463/31 |

FOREIGN PATENT DOCUMENTS

| | | |
|---|---|---|
| CN | 104823163 A | 8/2015 |
| CN | 105263590 A | 1/2016 |

* cited by examiner

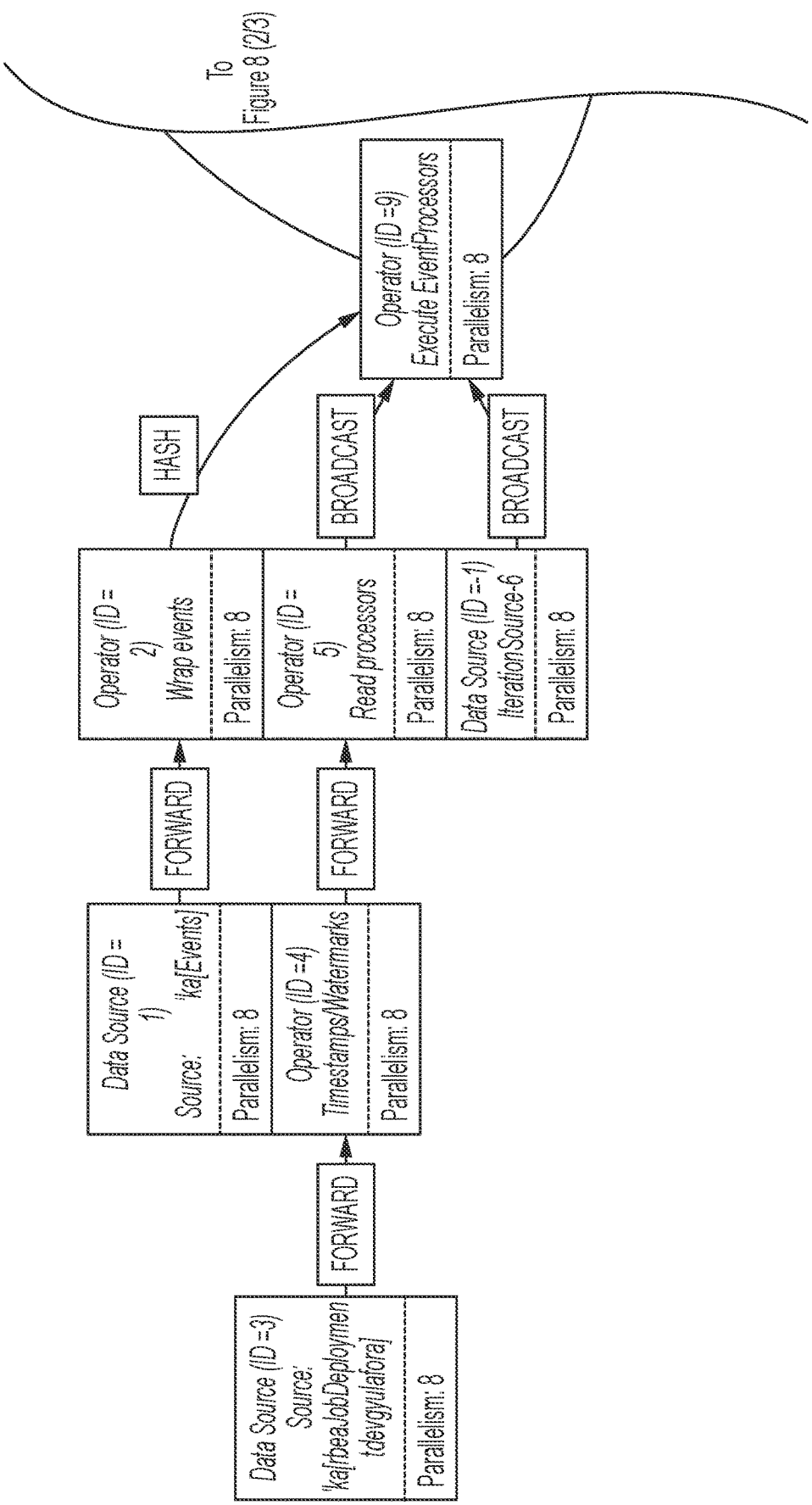
Figure 8 (1/3)

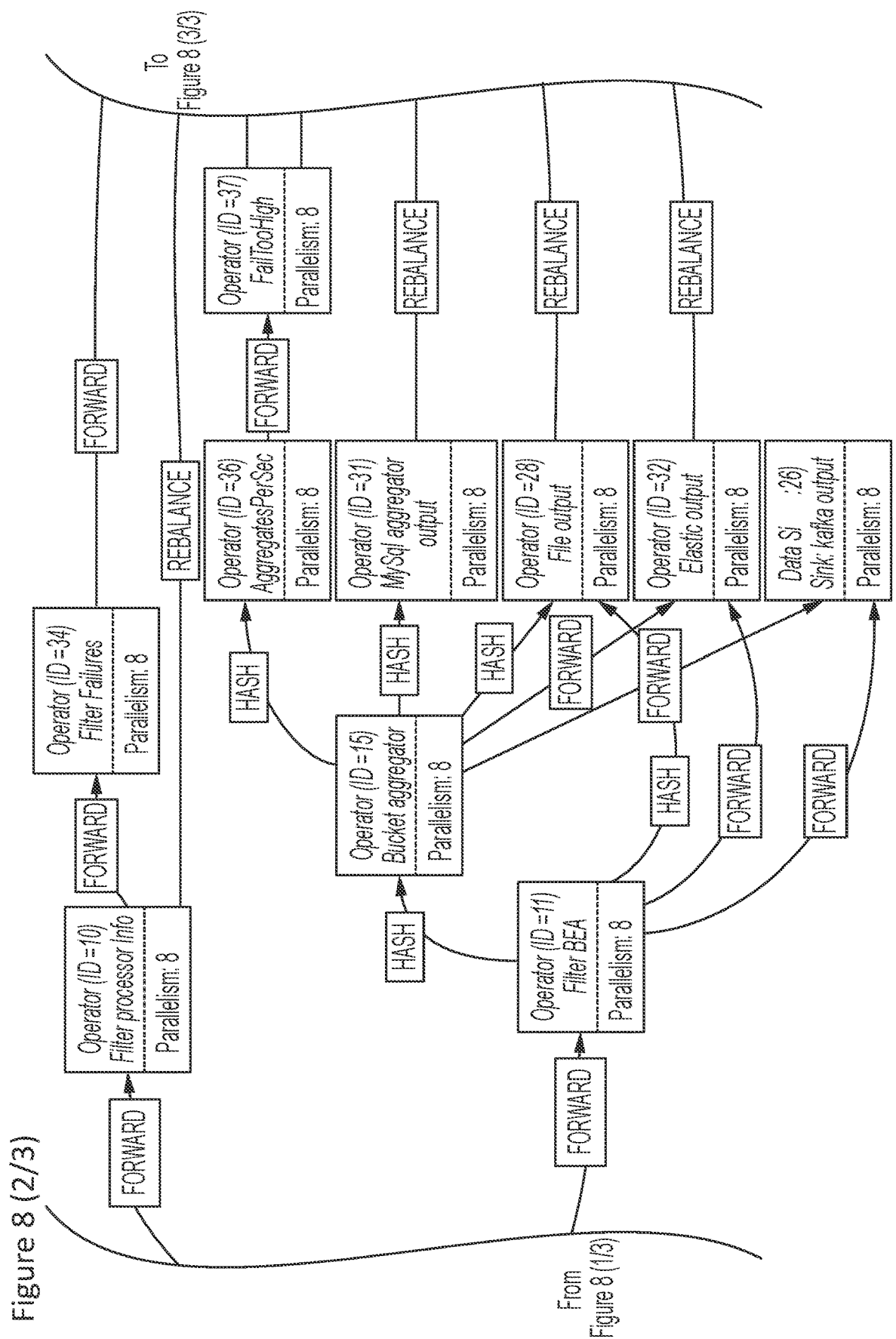

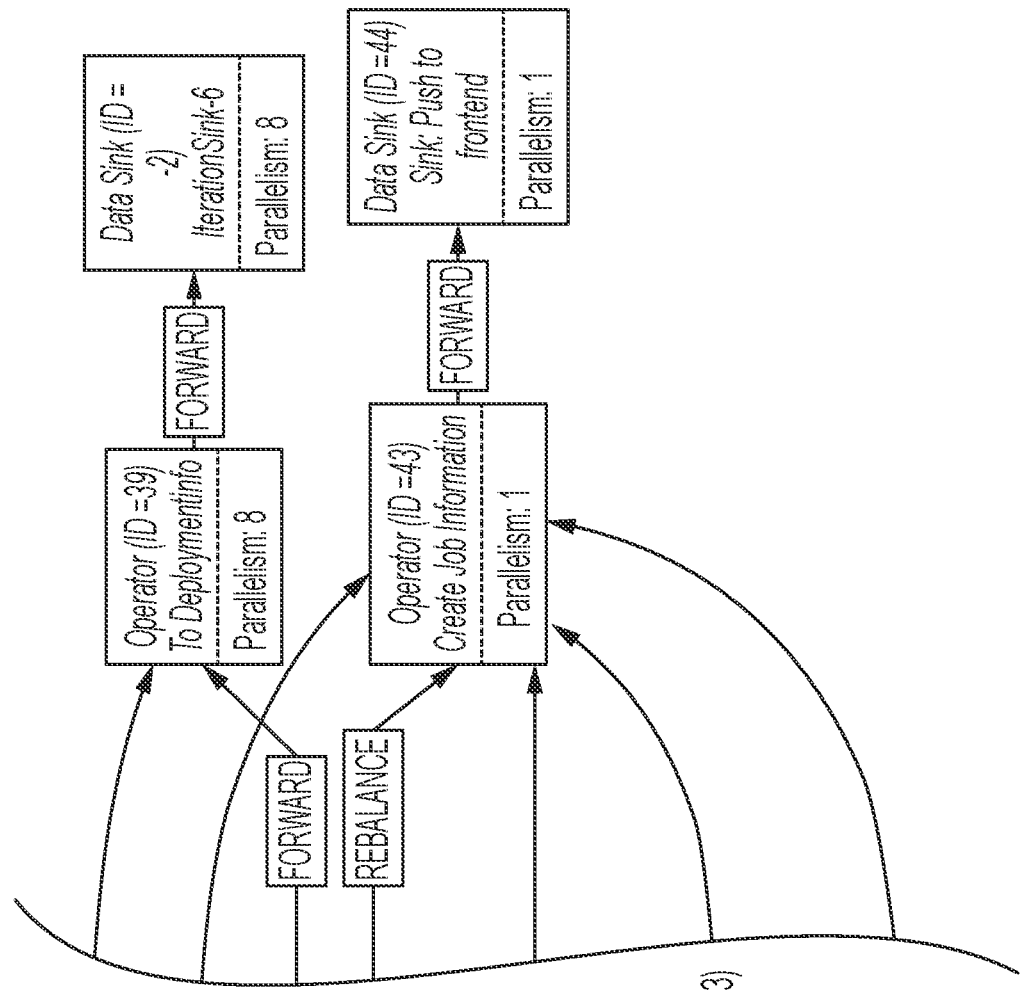
Figure 8 (3/3)

SCALABLE REAL-TIME ANALYTICS

CROSS-REFERENCE TO RELATED APPLICATIONS

This application is based on, and claims priority to, GB Application No. GB 1607825.5, filed May 4, 2016, the entire contents of which being fully incorporated herein by reference.

FIELD OF THE INVENTION

The present disclosure relates to a method and apparatus for processing data.

BACKGROUND OF THE INVENTION

A number of organizations are continuously collecting large quantities of data which can then be analyzed. The analysis may involve real-time analytics and/or may involve analysis of historical data. The data which is being collected may evolve over time.

Consider the example where the data relates to one or more games of a company. Analysis may be in relation to a single game or to data collected over a number of different games. Additionally there may be more than one platform provided, with different games.

Some computer implemented games may have a very large number of players, each having associated data such as identity (user-name), email, scores, time played, and other associated data which may be provided by the user, for example social network accounts and associated friends therein.

Game analytics is used to analyse data associated with games. The game analytic data can be used for a number of different purposes such as to understand user behaviour, enhance games, anomaly detection or the like. Managing the very large quantity of data for data analytics is challenging.

SUMMARY OF THE INVENTION

According to an aspect, there is provided a method comprising: receiving a first stream of first sets of data, each first set of data comprising an identifier and information about at least one event, wherein different first sets of data are associated with different identifiers and different first sets of data have information about different events; storing for each identifier, information about at least one event; and running a plurality of different scripts, wherein said information about at least one event is used by at least two different scripts.

The method may comprise outputting a second stream of second sets of data, wherein at least one second set of data comprises information about at least two different events, said at least two different events being received in different first sets of data in said first stream.

The method may comprise subsequently receiving at least one further script while the plurality of different scripts is running and running said at least one further script in addition to said plurality of different scripts.

The method may comprise determining for said at least one further script if said at least one further script uses information about at least one event which is being stored for at least one of said plurality of scripts or if information about at least one further event is to be stored for said at least one further script and if so, storing for each identifier information about said at least one further event.

The first stream of first sets of data may be received at a first entity, and second stream of second sets of data may be output to a second entity, said method may further comprise: receiving a third stream of third sets of data at a third entity, each third set of data comprising an identifier and information about at least one event, wherein different third sets of data are associated with different identifiers and different third sets of data have information about different events; storing for each identifier, information about at least one event; running a plurality of different scripts, wherein said information about at least one event is used by at least two different scripts; and outputting from the third entity to said second entity a fourth stream of fourth sets of data, wherein at least one fourth set of data comprises information about at least two different events, said at least two different events being received in different sets of data in said third stream.

The method may comprise aggregating data in said second and fourth streams of data.

The storing of information about at least one event may be for one or more events which are capable of being valid for at least one other event.

The method may comprise processing said information about said event and storing said processed information in said store as said information about said event.

The method may comprise receiving updated information about at least one stored event associated with a respective identifier and storing said updated information, said updated information being used by one or more of said plurality of scripts.

The method may comprise receiving updated information about at least one event associated with a respective identifier, using said updated information to determine updated information about the event and storing said updated information, said updated information being used by one or more of said plurality of scripts.

The method may comprise receiving update information associated with a respective identifier, retrieving the stored information about the at least one event associated with the respective identifier, and using the stored information and the received update information to determine updated information and storing for said respective identifier said updated information for use by one or more of said plurality of scripts.

The method may comprise receiving said first stream of sets of data from a plurality of different devices.

The identifier may identify a user associated with a respective device providing the respective set of data in said first stream.

The identifier may identify a device providing the respective set of data in said first stream.

The first sets of data in the first stream may comprise information about events generated during playing of a computer implemented game.

According to another aspect, there is provided a method comprising: receiving a first stream of first sets of data, each first set of data comprising an identifier and information about at least one event, wherein different first sets of data are associated with different identifiers and different first sets of data have information about different events; storing for each identifier, information about at least one event; running at least one first scripts, wherein said information about at least one event is used by at least one scripts; and subsequently receiving at least one second script while the at least one first script is running and running said at least one second script in addition to said at least one first script.

The method may comprise outputting a second stream of second sets of data, wherein at least one second set of data comprises information about at least two different events, said at least two different events being received in different first sets of data in said first stream.

The method may comprise determining for said at least one second script if said at least one second script uses information about at least one event which is being stored for at least one of said first scripts or if information about at least one further event is to be stored for said at least one second script and if so, storing for each identifier information about said at least one further event.

It should be appreciated that features of one aspect may be combined with any features from the other aspect.

The method may be implemented in any suitable device such as a computer, a server or the like. The computer or server or the like will be provided with at least one processor configured to run one or more computer executable instruction (computer program). At least one memory may be provided to store data and the computer program code or instructions.

According to an aspect, there is provided a computer apparatus, said computer apparatus comprising at least one processor and at least one memory including computer code for one or more programs, the at least one memory and the computer code configured, with the at least one processor, to cause the apparatus at least to: receive a first stream of first sets of data, each first set of data comprising an identifier and information about at least one event, wherein different first sets of data are associated with different identifiers and different first sets of data have information about different events; store for each identifier, information about at least one event; and run a plurality of different scripts, wherein said information about at least one event is used by at least two different scripts.

The at least one memory and the computer code may be configured, with the at least one processor, to cause the outputting of a second stream of second sets of data, wherein at least one second set of data comprises information about at least two different events, said at least two different events being received in different first sets of data in said first stream.

The at least one memory and the computer code may be configured, with the at least one processor, to subsequently receive at least one further script while the plurality of different scripts is running and run said at least one further script in addition to said plurality of different scripts.

The at least one memory and the computer code may be configured, with the at least one processor, to determine for said at least one further script if said at least one further script uses information about at least one event which is being stored for at least one of said plurality of scripts or if information about at least one further event is to be stored for said at least one further script and if so, store for each identifier information about said at least one further event.

The at least one memory and the computer code may be configured, with the at least one processor, to store of information about at least one event which are capable of being valid for at least one other event.

The at least one memory and the computer code may be configured, with the at least one processor, to process said information about said event and store said processed information as said information about said event.

The at least one memory and the computer code may be configured, with the at least one processor, to receive updated information about at least one stored event associated with a respective identifier and store said updated information, said updated information being used by one or more of said plurality of scripts.

The at least one memory and the computer code may be configured, with the at least one processor, to receive updated information about at least one event associated with a respective identifier, use said updated information to determine updated information about the event and store said updated information, said updated information being used by one or more of said plurality of scripts.

The at least one memory and the computer code may be configured, with the at least one processor, to receive update information associated with a respective identifier, retrieve the stored information about the at least one event associated with the respective identifier, and use the stored information and the received update information to determine updated information and store for said respective identifier said updated information for use by one or more of said plurality of scripts.

The apparatus may receive said first stream of sets of data from a plurality of different devices.

The identifier may identify a user associated with a respective device providing the respective set of data in said first stream.

The identifier may identify a device providing the respective set of data in said first stream.

The event may comprise an event identifier as well as data defining the value or characteristic or the like of the identified event.

The first sets of data in the first stream may comprise information about events generated during playing of a computer implemented game.

The first stream of first sets of data may be received at said computer apparatus, said computer apparatus being a first entity, and a second stream of second sets of data may be output to a second entity. A further apparatus being a third entity may be provided. This third entity may comprise at least one processor and at least one memory including computer code for one or more programs, the at least one memory and the computer code configured, with the at least one processor, to cause the third entity at least to: receive a third stream of third sets of data, each third set of data comprising an identifier and information about at least one event, wherein different third sets of data are associated with different identifiers and different third sets of data have information about different events; storing for each identifier, information about at least one event; run a plurality of different scripts, wherein said information about at least one event is used by at least two different scripts; and output to said second entity a fourth stream of fourth sets of data.

A system may be provided with the first, second and third entities. The second entity may comprise at least one processor and at least one memory including computer code for one or more programs, the at least one memory and the computer code configured, with the at least one processor, to cause the second entity at least to: aggregate data in said second and fourth streams of data.

According to an aspect, there is provided a computer apparatus, said computer apparatus comprising at least one processor and at least one memory including computer code for one or more programs, the at least one memory and the computer code configured, with the at least one processor, to cause the apparatus at least to: receive a first stream of first sets of data, each first set of data comprising an identifier and information about at least one event, wherein different first sets of data are associated with different identifiers and different first sets of data have information about different events; store for each identifier, information about at least one event; running at least one first scripts, wherein said information about at least one event is used by at least one scripts; and subsequently receive at least one second script while the at least one first script is running and run said at least one second script in addition to said at least one first script.

The at least one memory and the computer code may be configured, with the at least one processor, to cause output of a second stream of second sets of data, wherein at least one second set of data comprises information about at least two different events, said at least two different events being received in different first sets of data in said first stream.

The at least one memory and the computer code may be configured, with the at least one processor, to determine for said at least one second script if said at least one second script uses information about at least one event which is being stored for at least one of said first scripts or if information about at least one further event is to be stored for said at least one second script and if so, store for each identifier information about said at least one further event.

It should be appreciated that features of one aspect may be combined with any features from the other aspect.

According to another aspect, there is provided a non-transitory computer readable medium encoded with instructions for controlling a computer apparatus, in which the instructions when executed on a processor enable the processor to execute the steps of: receiving a first stream of first sets of data, each first set of data comprising an identifier and information about at least one event, wherein different first sets of data are associated with different identifiers and different first sets of data have information about different events; storing for each identifier, information about at least one event; and running a plurality of different scripts, wherein said information about at least one event is used by at least two different scripts.

According to another aspect, there is provided a non-transitory computer readable medium encoded with instructions for controlling a computer apparatus, in which the instructions when executed on a processor enable the processor to execute the steps of: receiving a first stream of first sets of data, each first set of data comprising an identifier and information about at least one event, wherein different first sets of data are associated with different identifiers and different first sets of data have information about different events; storing for each identifier, information about at least one event; running at least one first scripts, wherein said information about at least one event is used by at least one scripts; and subsequently receiving at least one second script while the at least one first script is running and running said at least one second script in addition to said at least one first script.

According to an aspect, there is provided a computer implemented method comprising receiving one or more event streams.

The event streams may comprise game data from one or more users.

The method may comprise running at least one script or method to compute at least one output in dependence on said one or more event streams.

The output may comprise at least one windowed aggregate.

State information may be used in said computing of the at least one output or at least one windowed aggregate.

The method may comprise providing an output in one or more different formats.

The method may comprise updating state information. This state information may be updated in dependence on information in said event streams.

The windowed aggregates may aggregate values associated with the event stream in a defined window of time.

In some embodiments the output may be in a plurality of different formats and may be provided in parallel.

Some embodiments provide an abstraction. The abstraction may be a field. The abstraction may be a user defined abstraction. The abstraction may define said state information. This may be done in a way that is transparent to the system.

The abstraction may have one or more attributes. The attributes may comprise one or more of the following attributes: field name; update function; initializer. The field name may be a reference, for example a string reference, for accessing an associated value as said state information. The update function may define how said abstraction is updated in response to one or more events in said event stream. The initializer may define a default value, an initial value or an initialiser function.

In some embodiments in response to receiving an event in said event stream, state associated with a user associated with said event is accessed from said abstraction. The state information is used in the processing of the event stream.

A new abstraction may be registered by passing it to a register script in an initialize method of the script.

In a further embodiment the received event stream may comprise a stream of substantially live data and said processing provides substantially real time analysis.

In another aspect a computer program product comprises computer executable code which when run is configured to provide any of the above methods.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Reference will now be made by way of example only to the accompanying drawings in which:

FIG. 8 (sheets 1/2 and 2/2) schematically shows a data processing pipeline used in some embodiments;

DETAILED DESCRIPTION OF SOME EMBODIMENTS

Some embodiments will now be described for the handling of big data. Some embodiments will be described in the context of handling game data. However, it should be appreciated that embodiments may be used to handle any type of big data and the invention is not limited to the handling of game data. For example, some embodiments may be applied to the scenarios where a user's interaction with one or more websites or social media platforms is tracked. Other embodiments may be applied in environments where a large number of transactions or event occur. For example some embodiments may be applied to share transactions. Some embodiments may be applied to vehicular traffic scenarios or weather monitoring applications.

Figure 1:
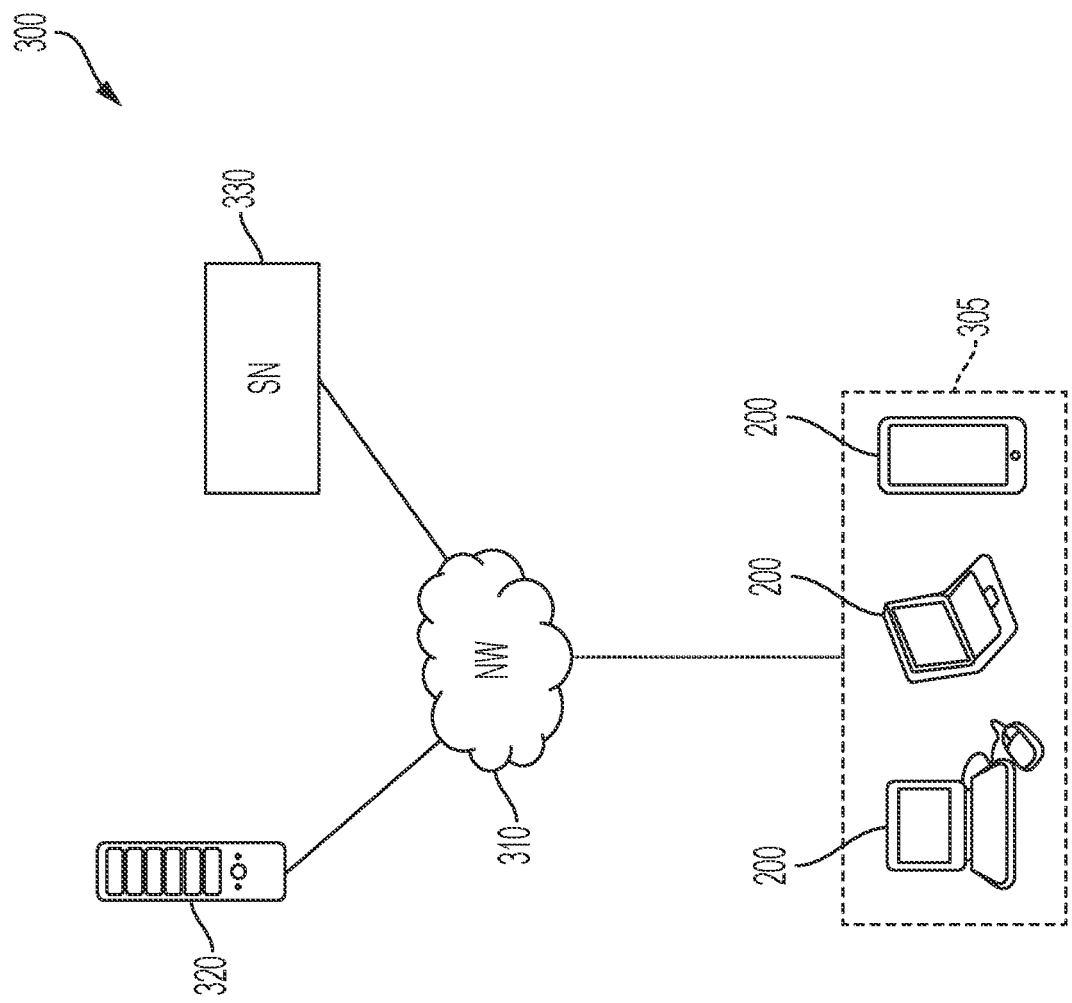
FIG. 1 schematically shows a system in which some embodiments may be provided.

FIG. 1 schematically shows a system 300 of some embodiments. The system 300 comprises a server 320 which may store databases of game players' details, profiles, high scores and so on. In practice, one or more databases may be provided. Where more than one server is provided, the database(s) may be provided in one database or across two or more servers 320. Where more than one server is provided, different servers may be provided in different locations to other servers.

The server 320 may also have a games data function. This may comprise a memory to store the computer game program and a processor to run the games program.

In some embodiments, the database function may be provided by different entities to those providing the game or other supported function.

The server may communicate via for instance the internet 310 to one or more user devices 305 and may further provide connections to a social network 330 such as Facebook™. It should be appreciated that any other network may alternatively or additionally be used with other networks instead of or in addition to the internet.

It should be appreciated that embodiments may be deployed in different game system architectures. For example, the computer game may be implemented as a computer game that is stored in the memory of the user device 200 and is run on the processor of the user device 200. However, the server 320 may handle some elements of the game in some embodiments. By way of example only, a game applet may be provided to the user device 200 and the locally running applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

It should be appreciated in other embodiments, the server may have a different, non-game function, depending on the application supported by the system.

Figure 2:
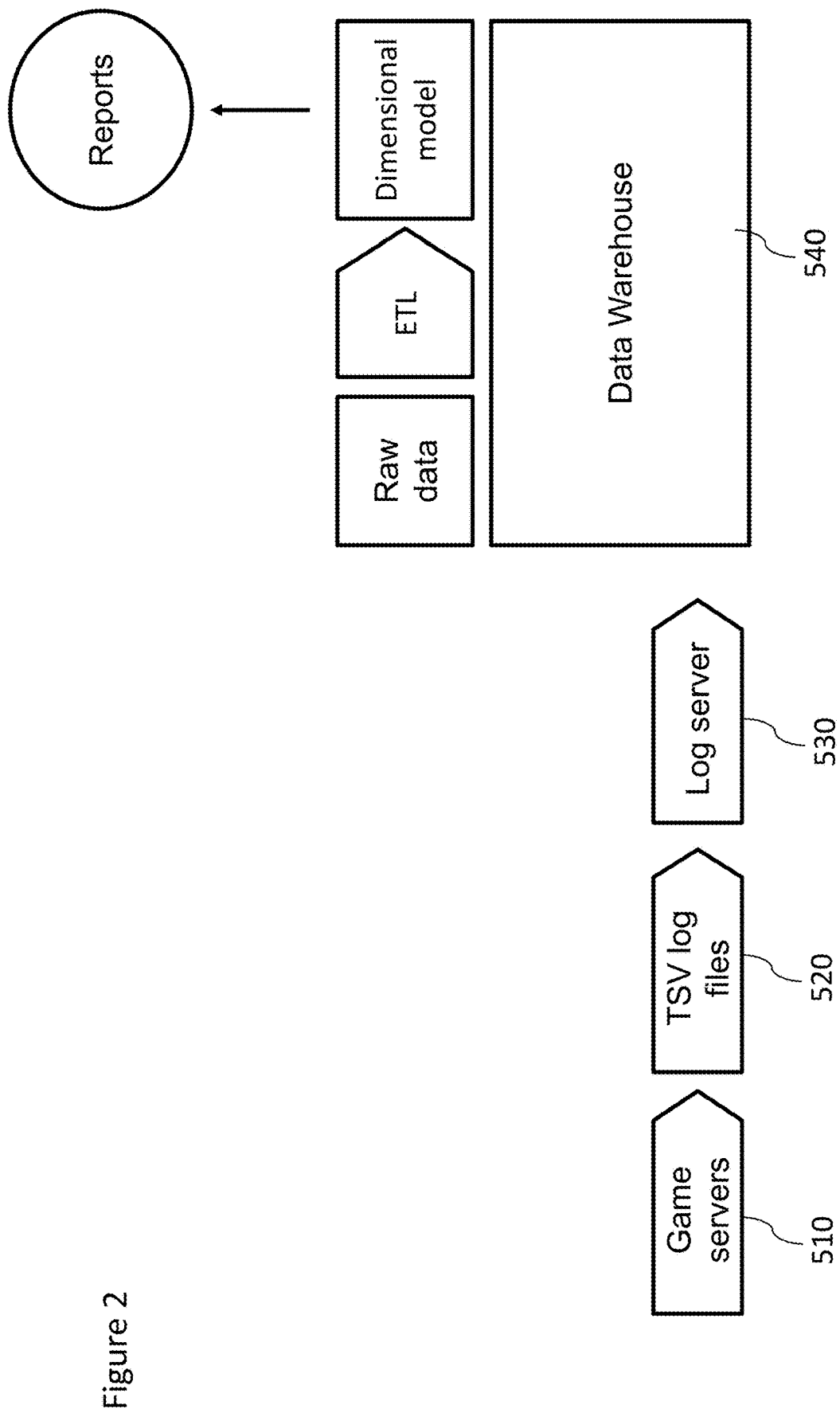
FIG. 2 schematically shows a data pipeline.

Reference is made to FIG. 2 which schematically shows a data pipeline. In this Figure, an arrangement is shown where game events may be stored, for example in a data warehouse. The data which is stored in the data warehouse can be analysed. The pipeline comprises game servers 510, TSV (tab separated value) log files 520, a log server 530 and a data warehouse 540. At the data warehouse, data is processed from raw data to a dimensional model which may be used to provide reports (or provided directly to data scientists). An extract, transfer, load ETL process may be used to transform the raw data to the dimensional model. Reports may be provided from the raw data and/or the dimensional model.

Figure 3:
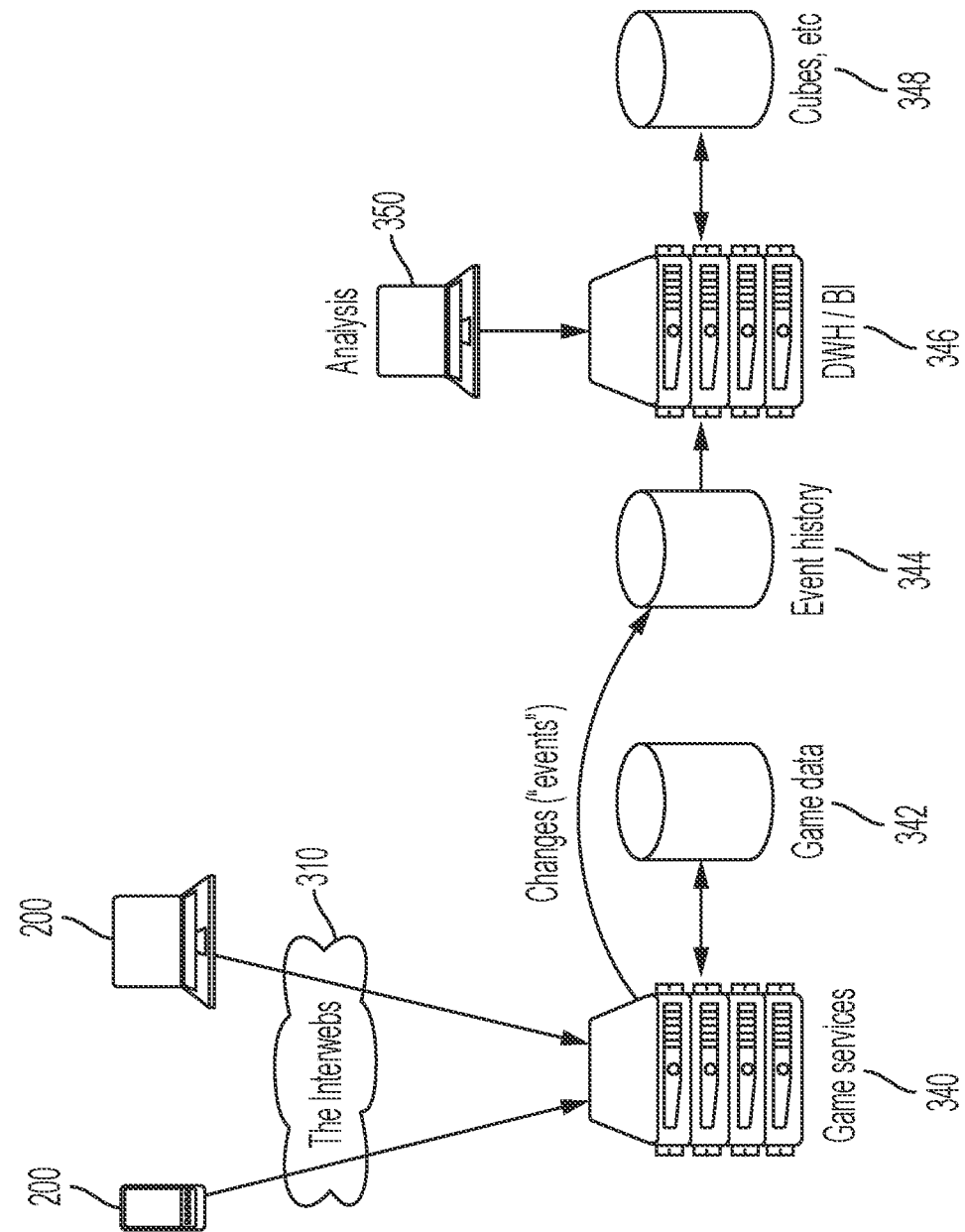
FIG. 3 schematically shows an example backend architecture.

Reference is now made to FIG. 3 which shows a backend architecture. This architecture again has an arrangement where game events may be stored, for example in a data warehouse. The data which is stored in the data warehouse can be analysed using analysis tools 350. User devices 200 such as described in relation to FIG. 1 are provided. The user devices 200 communicate with game servers 340 via the internet 310 or other suitable network. The game servers 340 may be any suitable servers. The game servers provide game services. The game servers may listen to requests or tracking calls from the clients on the user devices.

One or more game data servers 342 are arranged to store the player's current progress and other associated states. The servers may be sharded database servers or any other suitable server or servers. In some embodiments, these one or more servers may be relational database management systems. In some embodiments, the data in the game data servers may comprise data that is only used by the actual game. The game data format may in some embodiments be dependent on the associated game. In other embodiments, the data format may be the same across two or more games.

The incoming events are stored in a database cluster 344, and may also be written to files in a data warehouse and business infrastructure 346. The data warehouse and business infrastructure may be a distributed file system. Each event or at least some events are mapped to a table. The table may be provided in a data cube 348. The use of tables may make it simpler to compute aggregates over the data and/or do more complex batch analysis.

Some embodiments relate to a rule based event aggregator RBEA. In some embodiments, RBEA provides a scalable real-time analytics platform. This platform may be used for stream analytics. The platform may be implemented by computer executable code running on one or more processors. The one or more processors may be provided in one or more servers and/or one or more computing devices. This may be run on for example the data which is generated by the game servers. Of course, in other embodiments, the data which is generated or provided will depend of the functionality supported. This analysis is "real time" as opposed to the example discussed in relation to FIG. 2 or 3 where the analysis is carried out on the data which is stored in the data warehouse.

Stream analytics may use events which may alternatively be referred to as data records or data.

These events may be analysed in real time or after they have been received. The events may be provided in one or more streams. Data from a single stream or data from two or more streams may be used.

In some embodiments, the analytics may compare two or more streams or compare one or more streams with historical values and/or models.

Depending on the analytics, anomalies may be detected or an alert may be triggered if a specific condition occurs. The condition may be an error condition or any other suitable condition. It should be appreciated that analytics may be used to detect anomalies in some embodiments. However this is by way of example and other types of functions may be alternatively or additionally be supported which for example allow data to be collected and aggregated, trends to be identified and/or any other analytics to be supported.

Some embodiments may provide aggregated data as an output.

An output may be provided for a user.

This output may be displayed, for example on a dashboard.

The output may be provided as an input to a further computational process supported by one or more processors. The processors may for example be in one or more computers or servers.

Some embodiments may use a frame work for distributed big data analytics. The frame work may use a distributed streaming dataflow engine. The frame work may executes dataflow programs in a data-parallel and pipelined manner. The frame work may have a pipelined runtime system which may allow execution of bulk/batch and/or stream processing programs. The execution of iterative algorithms may be supported natively. Programs may be compiled into dataflow programs that can be executed in a database cluster environment. A central or distributed data storage system may be used. Data may be provided from queues or in any other suitable way.

To give some context to the issues of big data, the applicant has over 390 million monthly unique users and over 30 billion events received every day from the different games and systems. It should be appreciated that these numbers are by way of example and embodiments, may be used with more or less than these example number of events. It should be appreciated that embodiments may have application to much smaller data sets as well as in the context of big data.

With big data, any stream analytics use-case becomes a real technical challenge. It is desirable to have computer implemented tools for data analysts that can handle these massive data streams while keeping flexibility for their applications. Generally complex data stream analytics have required specialist knowledge. The approach provided by some embodiments simplifies the complex data stream analytics so the requirements for specialist knowledge is reduced.

It should be appreciated, that some embodiments may be used alternatively with relatively small streams of data.

In some embodiments, for analysis and/or other data needs outside of the core game, event data is used. To explain some example embodiments, the example event data is game data. However it should be appreciated that the data may be any other suitable data, depending on the functionality supported.

In some embodiments, the event data may be a simple text log with a fixed schema (tab delimited text) defines what happened in the game. It should be appreciated that the data may be any other suitable format, depending on the functionality supported.

An example event describing a game start is as follows:

| 10005 | SagaGameStart2 Indicates that a saga subgame has started, now including a gameround id. | coreUserId (long) | episode (int) | level (int) | gameRoundId (long) |

The first field provides an event number, the second field describes the event that has occurred, the third field defines the user identity, the fourth field describes the episode in which the event occurred, the fifth field describes the level in which the event occurred and the fifth field describes the game round in which the game event occurred. Some games may have one or more episodes or chapters which each comprise one or more levels. Some games may have only levels.

An example of the received raw event data is as follows:
20131017T113040.393+0200 17 10005 1006627249 7 12 1382002240393

It should be appreciated that in other embodiments any other suitable format may be used for the event data.

A subset of the data, may be loaded to a database cluster. This may support faster ad hoc querying and/or better support complex database queries.

In some embodiments, real-time aggregates may be computed over the events by aggregating data from all the streams into a database/database cluster and provides a data source for release monitoring and/or real-time dashboards.

Data warehouse engineers and data scientists usually work with relational data and the tools associated with it. Event stream data has a relatively different nature when it comes to complex analysis. A number of challenges may be addressed using basic aggregates and/or some simplifications. Typically a query language may be used. However at least some events may be related to other events by for example time and/or the context in which they occurred.

However, for questions such as what the user did before a game-start or how they navigated through a game (funnels, sessions, etc.), a basic database query language is limited.

Currently proposed options for dealing with these issues for relating different events are as follows:

1. Require a game developer to add the context wanted in a game, such as placement, and relational key. However, this may complicate the development work. This also requires the game developer to understand in advance what data might be required.

2. Select from the event tables in which there is interest, sort the events on player/time and run them through computer implemented code that associates the data, such as a custom reducer. This may be relatively inefficient in the daily processing. The events are stored with one table per event and immediately followed up with a plurality of different queries that put them back in the order they happened with different constellations of events. That data may only be seen when the daily batch has run.

3. Make a simplified model that can run for example in a basic database language. This is not always possible.

Accordingly some embodiments aim to provide a RBEA, such that is possible to perform the analysis in real-time. Accordingly, the RBEA is able to support connecting events or data in time and/or storing contextual information for the events or data in a scalable way, while providing results directly from the live streams. The RBEA may be widely accessible with easy to use web interfaces.

In some embodiments, RBEA is a platform designed to make large-scale complex streaming analytics accessible for users. RBEA may be such that object-oriented programming language scripts can be simply deployed. The object-oriented programming language may be any suitable object-oriented programming language. The interface which is displayed may be a web interface or any other suitable interface. The scripts may be deployed using a few "clicks" or any other suitable user interaction with the user interface. In some embodiments, a script may be deployed while one or more other scripts are running. The RBEA may be arranged to provide instantaneous results without requiring the user to have details of the deployment. This architecture may relieve data analysts or other users from the burden of managing large streaming clusters and deployments.

RBEA scripts may run on a hardware cluster and may deliver substantially real-time results from the live event streams. In some embodiments, the scripts may alternatively or additionally be run using stored data. Using RBEA, easy access may be provided for one or more stream analytics tools for defining and updating user states, writing outputs to one or a plurality of different output formats and/or creating global aggregators across all the users or a subset of users.

The RBEA API (application program interface) is configured such stream analytics tasks may be easy to write without requiring any knowledge of the underlying streaming engine while still achieving good performance at scale.

An example of a simple RBEA script will now be provided. A script is a user defined program to be executed by the RBEA.

The following script, which has been annotated for ease of understanding, counts all the finished games in 1-minute windows, while also writing the game end events to a text file:

```
// Counter for the number of people finishing a game in a given minute.
// Defining the method to receive live eventsdef processEvent(event, context) {
// Collect output data from "context", assign to variable in memory
"output"
    def output = context.getOutput( )
// Collect aggregator variables from "context", assign to variable in
memory //"agg"
    def agg = context.getAggregators( )
// Create an empty counter that counts up to 60 seconds
    // Create a counter with window size of 1 minute
    def gameEndCounter = agg.getCounter("GameEnds", 60000)
// Determine if the event passed to this function is a game end event
    if (isGameEnd(event)) {
// If this is a game end, increment counter
        gameEndCounter.increment( )
        // Write the event/result to storage
        output.writeToFile("GameEndEvents", event)
    }
}
```

A process event (processEvent) method is defined that will receive the live events one-by-one. The output object is obtained from the context. A counter is created called GameEnds with a window size of 1 minute (i.e., 60,000 milliseconds). For every incoming event it is checked whether this is a game end, and if so, the counter is incremented and the event is written to a text file named GameEndEvents. The script may be saved as FinishedGames.

Figure 4:
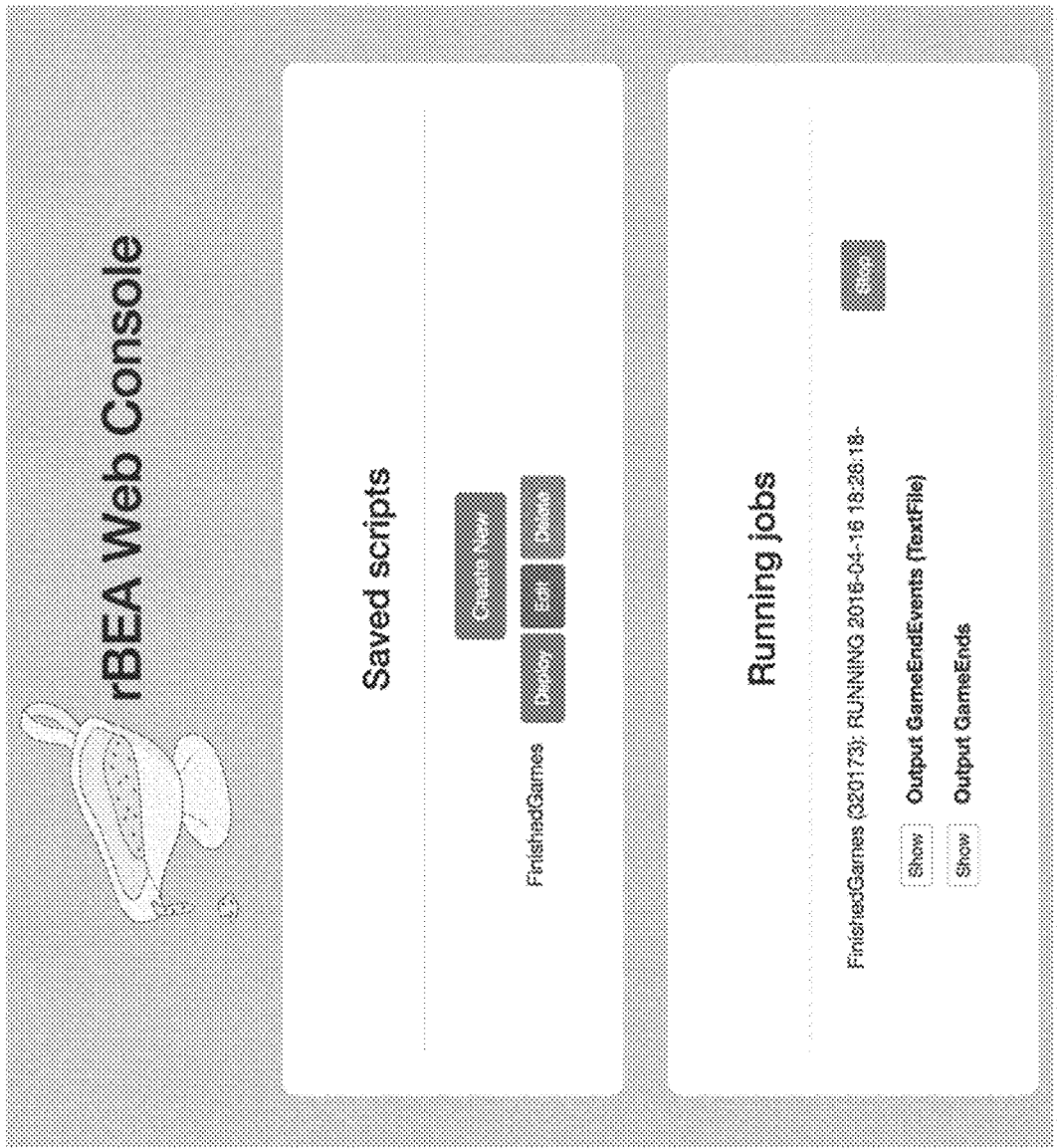
FIG. 4 shows an example of an image displayed in an embodiment.

Reference is made to FIG. 4 which shows a web interface. A list of saved scripts is shown along with options to deploy the script, edit the script or delete the script. If the deploy option is selected the interface will show which script(s) are running. The output of a script can be displayed using a display option.

Figure 5:
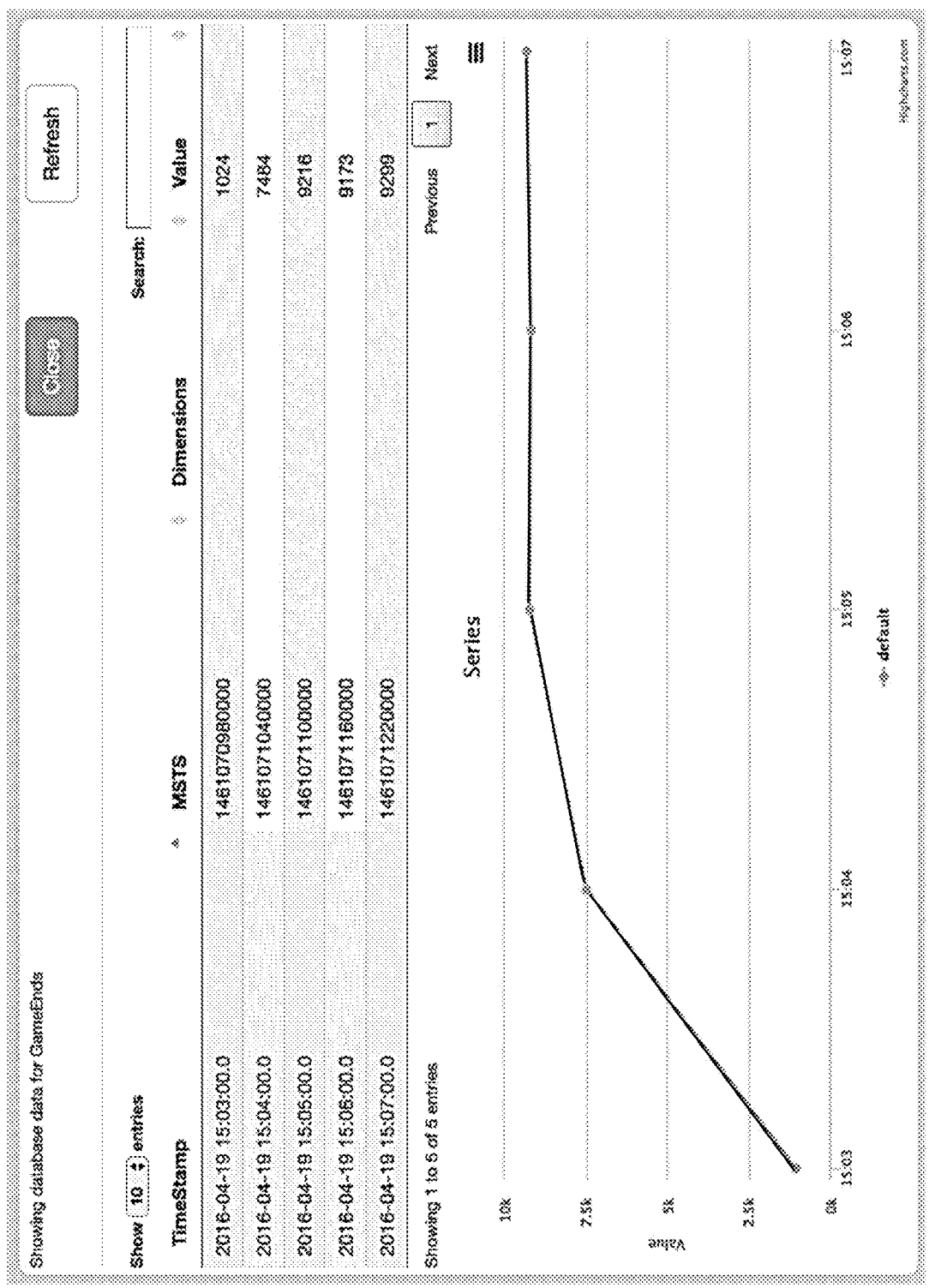
FIG. 5 shows an example of displayed database data.

In this example the RBEA created a table for the aggregator output that can be simply accessed by selecting the show button to provide instant data exploration. In this regard, reference is made to FIG. 5 which schematically shows two formats in which the data may be displayed. The game end events written to the text file can also be accessed as expected and downloaded on demand from the servers. In particular the events recorded for 5 one minute periods are shown in table form and also graphically represented, in the example shown in FIG. 5. It should be appreciated that once the data has been collected, it may be presented or output in any suitable format. The data can of course be further manipulated, in some embodiments.

In some real-world applications analysts would like to work with state that they compute for the users, such as the current session or current game. Computing state for the hundreds of millions of users is a challenge in analytics applications. Previous solutions were such that real-time applications could only access stale user state (for example pre-computed by batch jobs) which often did not meet the application requirements.

In RBEA developers are able to create and update user states in real-time. This uses hardware and/or computer software which support state handling capabilities. The RBEA provides a simple abstraction, referred to as a field, that allows users to define arbitrary user-state in a way that is transparent to the system.

New fields can be registered by passing them to a registerField(field) method of the registry in the initialize method of the script.

Fields are defined by specifying one or more of the following attributes:
1. Field name: This is a string reference for accessing the value from the state data StateData
2. Update function: Defines how the Field will be updated for each incoming event. The update function may come in two flavors: (State, Event)→State and (Context, Event)→State.
3. Initializer: By default states are initialized to null, but it is possible to define an initializer function (UserID-→State) or an initial state value.

The availability of fields lends itself to a clean pattern for stateful streaming programs:
1. Define any state used by the application as fields in the initialize method.
2. For each event or data received, access the state for the current user, current user device or other identifier from the state data.
3. Enrich the current input and do the processing Some embodiments allow for the computing of total transactions per level. In other words some embodiments, allow for the determining of a number of events associated with a particular state. Consider the example where it is desired to compute total revenue per level in a game every half hour. From the process event method's perspective, every time there is a transaction, it would be desirable to add the amount to an aggregator for the current level. The problem is that transaction events do not contain information about the current level. Whenever a player starts a new game, there is a game start event which contains the level information and subsequent transactions should belong to that level. To solve this use case in the framework of some embodiments, it is desirable to keep track of the current level for each player as a state. This is the type of stateful application that Fields can be used for:

```
// Compute total revenue per level in a given game every 30 minutes
// Define method
def processEvent(event, ctx) {
// Collect aggregator variables from "ctx - context", assign to variable in memory
//"agg"
    def agg = ctx.getAggregators( )
```

```
// Collect state data from "ctx", assign to variable in memory "state"
    def state = ctx.getStateData( )
    // Define sum aggregator with 30 minute window size
    def amountPerLevel = agg.getSumAggregator("Amount", 30*60*1000)
        // The aggregated values (amountPerLevel) are written to a text file instead of
Relational database management system
    amountPerLevel.writeTo(OutputType.FILE)
// Determine if the event passed to this function is a transaction
    if(isTransaction(event)) {
            // Retrieve the current level from state data
            Integer currentLevel = state.get("CURRENT_LEVEL")
                // Increment counter for current level, each level having its own counter
                    amountPerLevel.setDimensions(currentLevel).add(getAmount(event))
    }
}
// New method to register the current level the user is playing
def initialize(registry) {
    // Define current level state, initialized to a null value (-1)
    def currentLevel = Field.create("CURRENT_LEVEL", {
                // Update the level for each new game start
                Integer prevLevel, Event e -> isGameStart(e) ? getLevel(e) : prevLevel
    }).initializedTo(-1)
    // The state is registered (current level) for this job so it is computed automatically
    registry.registerField(currentLevel)
}
```

The current level field automatically keeps track of which level each user is currently playing. This information can be easily accessed for the current player (based on the event) from the state data as can be seen in the process event method. This state data can be used in one or more different scripts.

It should be appreciated that in this example, state is level. The state can be any other suitable parameter. In some embodiments, the parameter may be provided in one set of event data but is required in conjunction with different event data which does not include that parameter.

Some embodiments may require two or more state conditions to be part of the script or method.

In some embodiments, information which is used as state information may simply be provided by received events.

In some embodiments, to update state information may require some processing. For example the currently stored state information may be modified by the received information. For example the received information in the stream may indicate an increment or decrement amount. Of course any other processing may be performed.

In some embodiments the state information may need to be determined from received information. That determination may require processing of the received data, optionally with one or more other and/or previous data.

In some embodiments, the stored state may be updated using information about a new event and the previously stored information about an event to create a new state value that is stored.

For example a level may be changed in response to receive a level complete event. Thus the current level is the current state, the new event would be level completed and the new current level would be determined therefrom.

Another example could be to track whether a user has crushed 100 red candies by tracking successful game end events. For example an event relating to a successful game end comprising information that 20 red candies were crushed is received. On receiving a subsequent event indicating 10 red candies crushed, a total of 30 red candies is going to be stored i.e the currently stored 20 candies and the new 10 candies.

Game events are given by way of example only and the events in question will depend on the context in which embodiments are deployed.

Figure 6:
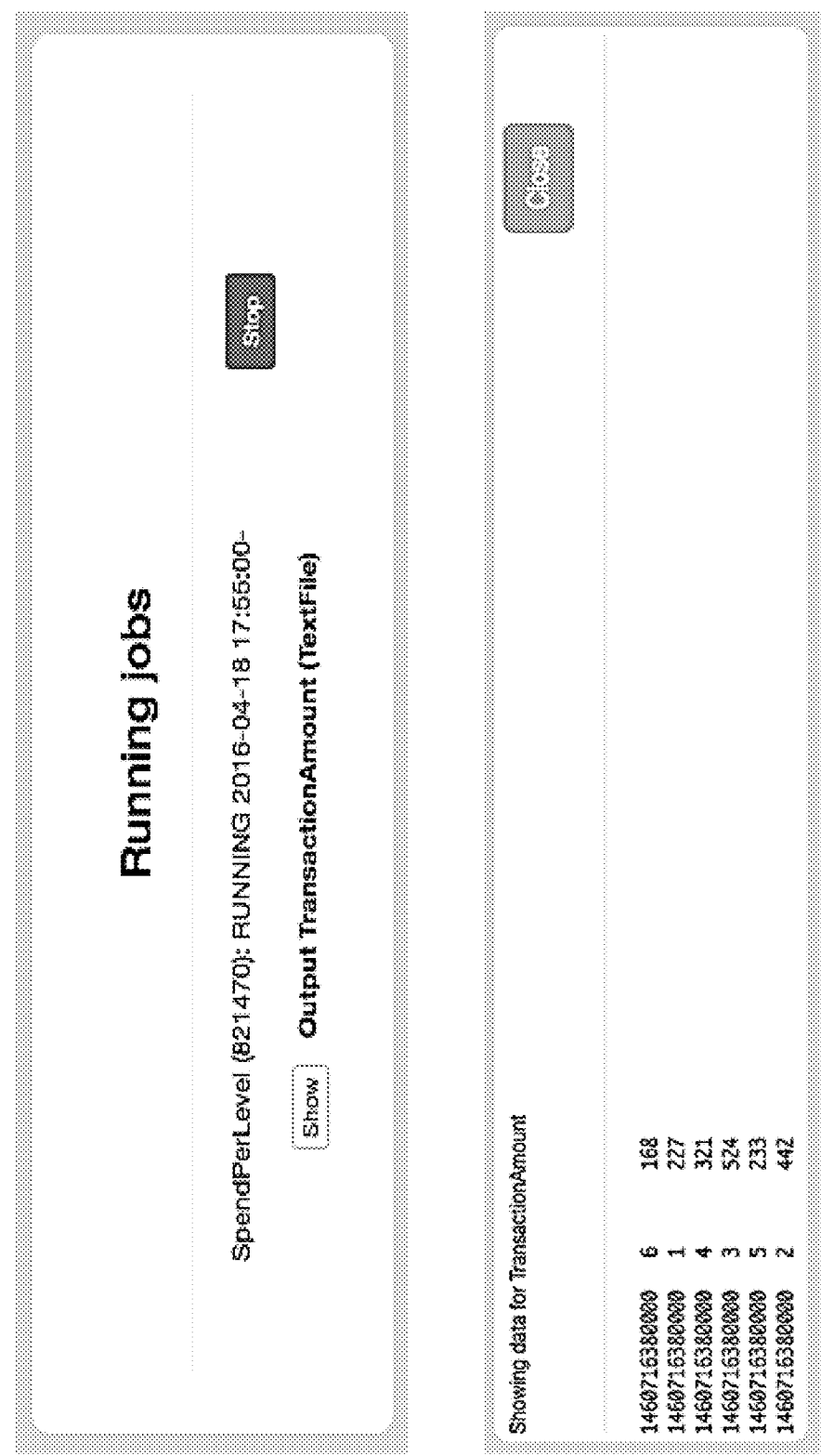
FIG. 6 shows an example of an image displayed when an application is deployed and the associated data.

Reference is made to FIG. 6 which shows the image displayed when the application is deployed. The application is executed by the RBEA backend job. The backend is an instantiation of the REBEA system. A stream processing job runs on a suitable framework that serves as the backend for the RBEA. The text file contains the aggregated amounts per level which can be accessed through the GUI (graphical user interface). By selecting the show option the aggregated amounts per level are shown. It should be appreciated that in some embodiments, any other suitable user interface may be provided alternatively or in addition. In some embodiments the aggregated amount information may be provided in the alternative or in addition to another computer implemented process.

The RBEA interfaces may be configured to abstract away at least some or all of the stream processing internals from the users. For example one or more of the following may be abstracted away from the users:
  Reading event streams;
  Parallelizing script execution;
  Creating global windowed aggregators;
  Creating and updating user states;
  Writing output to one or more target formats; and
  Fault-tolerance and consistency.

Executing these abstractions in a way that it will scale to many parallel RBEA jobs, on the billions of events and millions of users may require a streaming dataflow engine with one or more of the following properties:
  Highly scalable state abstractions;
  Support for custom windowing logic;
  Support for cyclic data flows; and
  Exactly-once processing guarantees.

It should be appreciated that with differing scales of events and/or users may allow different criteria to be used in selecting an appropriate dataflow engine or platform.

Only one deployed and continuously running job may serve as a backend for all running RBEA scripts. However, in other embodiments, the function may be provided by two or more scripts. The scripts may be running in operators (as described later) sharing the cluster resources in an efficient way. Scripts deployed on the web frontend are sent to the already running job, and the lifecycle management (adding/removing scripts, handling failures etc.) of the RBEA scripts is handled by the operators themselves.

Different RBEA operations (incrementing aggregators, writing output) are translated into different outputs for the operators.

Figure 9:
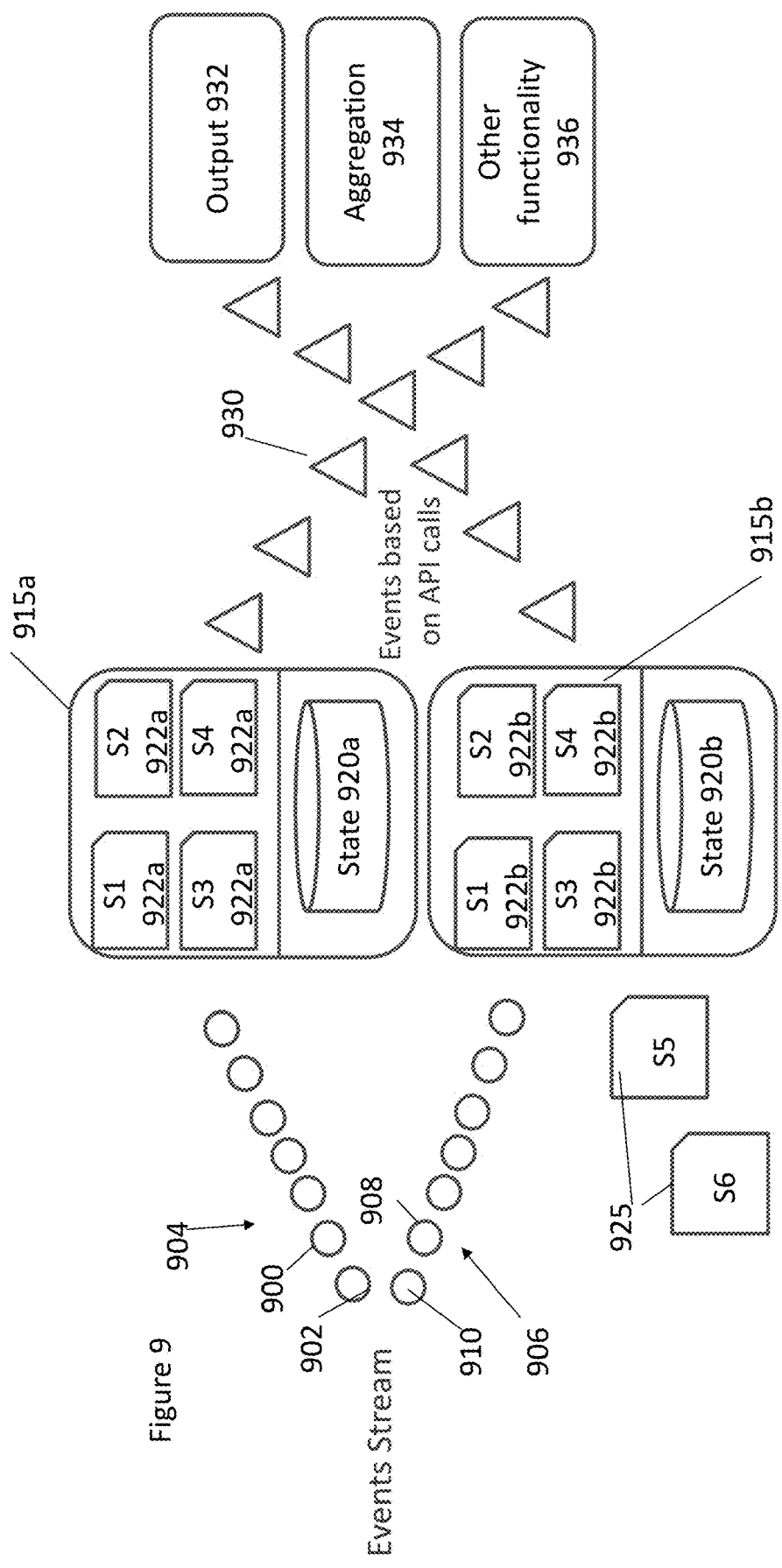
FIG. 9 schematically shows a processing arrangement of some embodiments.

Reference is now made to FIG. 9. By way of example only, a use case will be considered. In this example use case, the amount of revenue associated with a particular level is to be monitored. In order to be able to monitor this, information about a current level and information about the purchases made while playing that level is required. The events which are provided from the client devices, in this example, do not have the purchase information and the game level in the same event. Rather, the game level is provided along with a user identity in one type of event. Information about purchases are provided in different events with user identity.

In FIG. 9, 904 references an event stream from a first user and 906 represents an event stream from a second user.

For example, event 900 may represent a game start event for the first user and will have the user identity of the first user, an indication that a game is being started and a game level. Event 902 may represent a game purchase event for the first user and will have the user identity of the first user, an indication of the game item being purchased and a purchase price.

Event 908 may represent a game start event for the second user and will have the user identity of the second user, an indication that a game is being started and a game level. Event 910 may represent a game purchase event for the second user and will have the user identity of the second user, an indication of the game item being purchased and a purchase price.

Some embodiments provide an approach which allows such queries to be run on data streams. In particular, embodiments cause the events which are required for the query to be created. A query is written using the RBEA API that may do one or more of read and/or modify state, aggregate data, create outputs and anything else supported by the RBEA. In the case where the query is the amount of revenue associated with a particular level, the events which are created will have the current game level and the purchase price.

In FIG. 9, a partition 915 is provided for each respective user. A partition is defined as all events belonging to the same key (in this example the key is the user id). In the example show in FIG. 9 a first partition 915a is associated with the first respective user and a second partition 915b is associated with the second respective user. Thus embodiments may partition events by user identity. It should be appreciated that in other embodiments, a different criteria may be used to partition events.

The scripts which are being run for the respective queries are deployed in the partitions for each user. In the example shown, scripts S1 to S4 which are deployed with respect to the first user's data are referenced 922a. Scripts S1 to S4 which are deployed with respect to the second user's data are referenced 922b. In reality one physical machine may for example contain millions of user partitions. In some embodiments scripts are stored once on every physical machine, so partitions share the scripts. However, in other embodiments, more than one copy of a script may be provided on a given physical machine.

When a script is deployed, it is determined what state is required for the query. For example, in the case of the example query, the state will be the current game level. This state is stored in a state data store 920 for that user. The state data store for the first user is referenced 920a and the state data store for the second user is referenced 920b. This state can be used by any query. For example another query may be the number of attempts to complete a particular level. The level state can be used in that latter query as well as the query with the amount of revenue per state.

It should be appreciated that when a particular value for a state changes, the value in the state data store is updated.

The scripts when deployed will output the required events 930 for the associated query. Those events will be directed to the appropriate consumer of the events. In some embodiments, all events are passed to a given consumer which will discard the unwanted events, that is events not relevant to the consumer of the events. In other embodiments, only the events required by a consumer of the events will be provided to that consumer.

In FIG. 9, some example consumers of events comprise an aggregator 934, an output 932 and/or any other suitable functionality. The consumer of the events will in turn run a script to provide the required output. For example in the case of an aggregator, the data from the received events may be summed.

Scripts 925 supporting further queries may be broadcast and received by each of the user partitions 915 and thereby deployed. Those scripts may use existing state information or cause the required state information to be stored from the received information.

In this way, embodiments allow analytics scripts to be run on live streams. Conventional approaches may require a window approach where data for a given time period is stored and then several scripts are run against the stored data to achieve a single query. This can be resource intensive, particularly where a number of different queries are being run.

An advantage of some embodiments is that events are read only once and different scripts are sent to the user partitions. The events thus are read once but are used by more than one script. This contrasts with other real-time approaches which may read the data independently for each deployed application (script).

Another example of a query that may be run relates to a test mode. A test mode may be allocated a test mode identifier. That test mode identifier may be stored as state information and one or more different types of events may be output with that test mode identifier.

Some embodiments may thus allow state to be shared between different queries or scripts being run.

Figure 7:
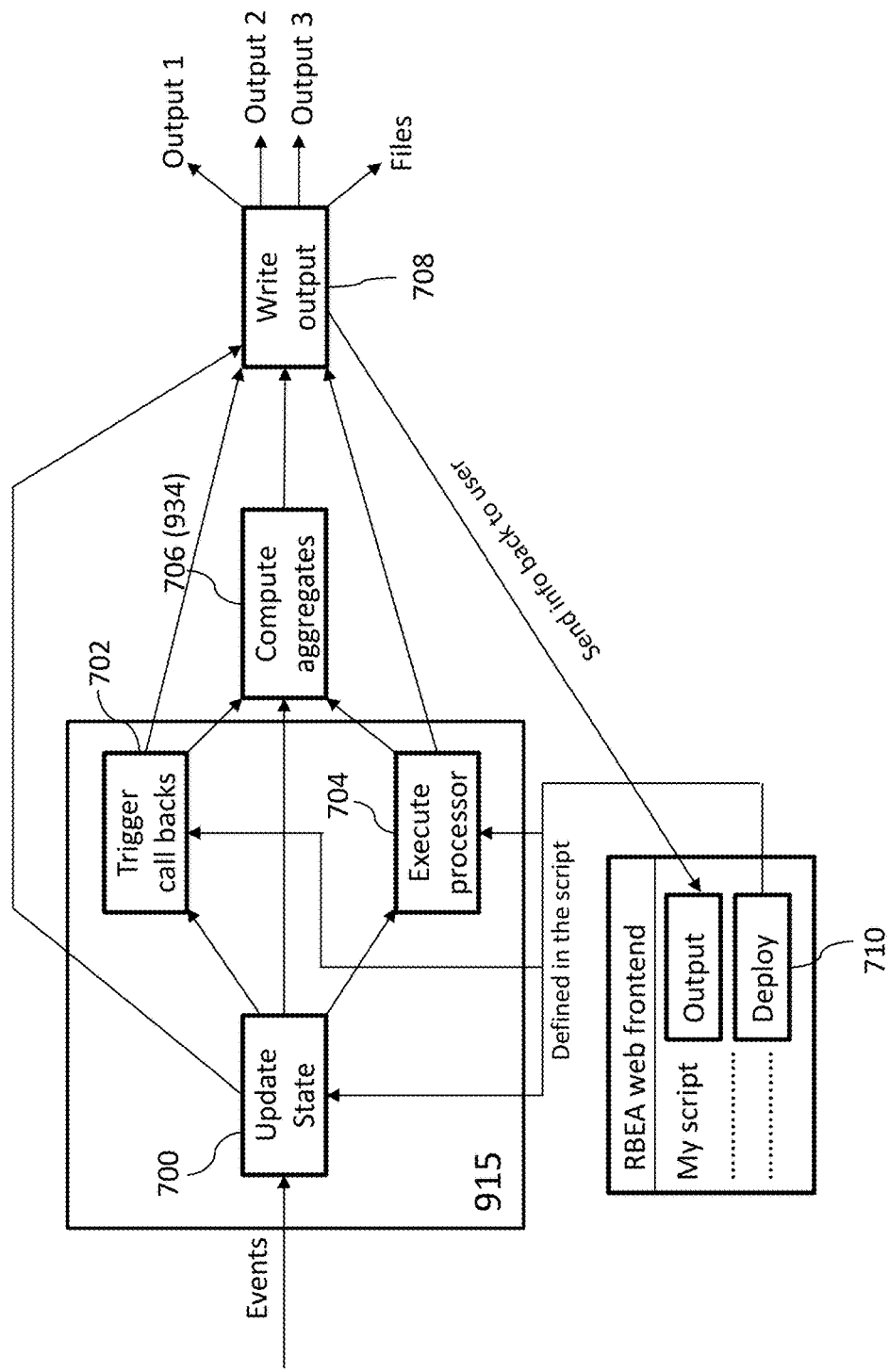
FIG. 7 schematically shows an overview of the deployment/execution of scripts in some embodiments.

The input events may comprise a time stamp. Alternatively or additionally, the output events may comprise a time stamp. Reference is made to FIG. 7 which schematically shows in more detail how RBEA scripts are deployed/executed on an engine. The user states are updated based on the defined update function and the new received event by the update state part 700. If there is a change in the user state, one or more call backs may be triggered (if a user script is registered as a listener to these changes in state) by the trigger call backs part 702. After updating the state and triggering possible call backs, the process event methods is executed by the execute processor 704. The update fields part, the trigger call backs part and the executer processor correspond to functions of the partition 915 of FIG. 9. A web front end part 710 is configured to allow scripts to be written and deployed. The compute aggregates part 706 is configured to provide an aggregation of results and corresponds to the aggregation function 934 of FIG. 9.

In some embodiments, the update state part can provided an input to the compute aggregates part 706, depending on the defined update function. One or more of the update state part 700, trigger call backs part 702, the compute aggregates part 706 and the execute processor part 704 are configured to provide outputs to a write output part. The write output part 708 is configured to provide an output to the output part of the web interface part 710 and/or one or more outputs, e.g. a message broker output, a relational database management system output and/or a file output. This write output and the compute aggregates part may correspond to the output 932, aggregation 934 and other functionality 936 of FIG. 9.

In some embodiments, there may be four main stages of computation:
1. Read event streams and receive newly deployed scripts.
2. Update user states, trigger user defined call-backs and run the process event methods (processEvent methods) of the deployed scripts.
3. Compute windowed aggregates as produced by the scripts.
4. Write the outputs to the selected one or more formats.

Each of these stages will now be discussed in more detail.

Reading the events and scripts—the live event streams are read with a consumer that tags events with a category or feed name from where they are coming. This allows users can freely decide what category or feed names they want to listen to when running their scripts. A keyed stream may be created from the event stream keyed by the user identity.

Scripts may be received in text format from the web frontend through a message broker as simple events, and are parsed into the appropriate EventProcessor interface. New scripts are may be hot-deployed inside the already running job. In particular the scripts can be received by the user partitions and deployed whilst the system is running other scripts. When a script is received, a check is made to see if it uses any of the existing stored state(s) or if it needs some other state. If the new script need state that is not stored, the system is configured such that this new state will be determined from received events and stored in said data store. The new script can be received in a script stream. This is generally different to the event stream. However, in some embodiments, the events may be in the same stream as the scripts.

Embodiments may be scalable in that a machine may be provided for a first set of users and a further machine for a second set of users and so on. In embodiments, the same scripts are deployed in the each partition of the same machine. In some embodiments, the same scripts are deployed in different machines.

The scripts may be broadcast to the different machines and compiled locally on the machines.

In some embodiments, one or more stateless scripts may run in parallel to one or more state based scripts. These scripts can run in parallel on the same machines and/or partitions. In other embodiments, the stateless scripts may be run separately to the state scripts.

In some embodiments, the same scripts may be run not only on real time data but also on stored data. The scripts may be run at the same time and the results of the real time processing and the processing of the data may be compared.

In some embodiments, run time metrics associated with the running of one or more scripts may be determined. These metrics may comprise one or more of: time taken for script to execute; which state is being accessed; is any state being accessed; and any other suitable metric. These run time metrics may be used to control how a script is deployed and/or the number of users which are supported by a machine which is deploying the script. The run time metrics may be for a particular script and/or a set of scripts.

Computing states and running the scripts—user states are computed in the same operator where the scripts are executed to exploit data locality with key-value state abstractions. For this an operator which receives both the event streams and the user scripts as events is used. The user scripts may be broadcast.

For new events, the processEvent method of the already deployed RBEA scripts is called. For new scripts, these may be hot-deployed inside the operator so it will be executed for subsequent events.

The operator may be a map operator.

The following class shows a simplified implementation of the execution logic:

```
// Define new class "RBEAProcessor" (methods and variables)
class RBEAProcessor
// This class extends the standard method "RichCoFlatMapFunction"
// Flatmap A FlatMap is an operator that receives one input and may
produce zero or more outputs. A CoFlatMap means that events from two
streams are processed and a different method (flatmap1/2) is triggered
based on which stream the event comes from.
// Flattening converts a list of lists to a list.
// e.g. list(list(1,2,3),list(2,6,8)) becomes list(1,2,3,2,6,8) once flattened
        extends RichCoFlatMapFunction<Event, DeploymentInfo,
        BEA> {
    // Computed fields (information) for the current user
    ValueState<Map<String, Object>> = userStates;
        // Omitted details...
// tuple is an ordered list, flatmap1 takes event data and updates
information relating to the current //user
    public void flatMap1(Event event, Collector<BEA> out) {
        // Update states for the current user
        Map<String, Tuple2<?, ?>> updatedFields = updateFields(event,
        out);
// Send information back up the chain if user state has changed.
        // If any fields have changed the update call backs are triggered
        on those tiggerUpdateCallbacks(updatedFields, out);
// Execute user scripts
        // Call the processEvent methods of the user scripts
        executeScripts(event, out);
    }
// new method, named flatmap2
    public void flatMap2(DeploymentInfo info, Collector<BEA> out) {
        // Create an event processor named "proc" in memory (Instantiate the
event processor)
            EventProcessor proc = info.createProcessor( );
        // The processor are added to the list of processors
        addProcessor(proc);
        // Start processor (Call the initialize method of the processor)
        initializeProcessor(proc);
    }
}
```

When the operator receives a new event it retrieves the current user state from the state backend, updates the states, then executes all the scripts that listen to the current category or the like. A state backend is used to persist states, which is preferably scalable. The backend may be an embeddable persistent key value store.

During script execution most calls to the API methods are translated directly into output elements which are collected on the output collector. For example, when the user calls output.writeToFile(fileName, myData) in their script, the operator provides an output that encodes the necessary information that the sinks will need to write the user data into the appropriate output format.

Different types of API calls (Aggregators, Relational database management system output, Message broker output, etc.) will, of course, result in different output information but generally contain the information that is enough for downstream operators to know how to deal with them.

The operator may produces some information on the currently deployed processors, such as notification on failures. This is used for removing faulty scripts from all the subtasks. This may alternatively or additionally be used to report the error back to the frontend so that users can fix their scripts.

A co-flat map operator at the end produces three main types of output: data output, aggregation, and job information. The flat map operator applies a function to every item emitted by a channel, and returns the items so obtained as a new channel. Whenever the mapping function returns a list of items, this list is flattened so that each single item is emitted on its own. Cooperators allow the users to jointly transform two data streams of different types, providing a simple way to jointly manipulate streams with a shared state. It is designed to support joint stream transformations where union is not appropriate due to different data types, or in case the user needs explicit tracking of the origin of individual elements.

Computing window aggregates—windowing functionality is used to do the actual aggregation on the aggregator output coming out from the main processing operator.

The information received is in the form of: (job_id, aggregator_name, output_format, window_size, value). It should be appreciated that this is by way of example only and in some embodiments one or more of the data in the information may be omitted. In some embodiments, alternatively or additionally, one or more other data may be provided.

RBEA may support sum aggregators, counters, and/or custom aggregators.

Computing of the window aggregates is provided in some embodiments. The windows may be processed based on event time extracted from the events. In some embodiments, different window sizes per key are provided in the dataflow. In other embodiments, fixed size windows may be used.

In some embodiments, timestamp extractors are defined for the incoming event streams which operate directly on the consumed data for correct behaviour.

To create different window sizes on the fly, flexible window mechanisms may be used to define the window assigner that puts each element in the correct bucket based on the user-defined aggregator window.

To do this, a tumbling event time window assigner is extended:

```
//      Create new class named "AggregtionWindowAssigner" which
        extends
// "TumblingEventTimeWindows"
class AggregtionWindowAssigner extends TumblingEventTimeWindows {
// Public method (easily accessible by other classes)
"AggregtionWindowAssigner" calls a
// function "super"
    public AggregtionWindowAssigner( ) {
        super(0);
    }
// Modify standard behaviour
    @Override
// Public method "assignWindows" - returns "Collection<TimeWindow>"
    public Collection<TimeWindow> assignWindows(Object in, long
      timestamp) {
        //get the aggregate input object "in" in a BEA data format
BEA aggregateInput = (BEA) in;
// get window size of aggregateInput
        long size = aggregateInput.getWindowSize( );
            // calculate the start and end time of the time window
        long start = timestamp - (timestamp % size);
        long end = start + size;
            // return the start and end time of the window
        return Collections.singletonList(new TimeWindow(start, end));
    }
}
```

Now that this has been done, a window reduce operation may be performed to sum the aggregator values in each window and send it to the correct output.

Writing the outputs—the user may output to one or a plurality of different output formats in their processing scripts. Each output record generated by calling one of the output API methods will hold some metadata for the selected output format. For example:

File output: file name
Table output: table name
Message broker: category name

There may be one operator for each output format that will write the received events using the metadata attached to them.

These operators may produce some information for the web frontend so that it can show the generated output to the user. For instance when a first record to a new output file is received, it outputs some meta information for the web frontend so that it can display this file for the user for the running script.

Reference is made to FIG. 8 which shows a data processing pipeline. Some of the features of the data processing pipeline are configured to allow for communication with the web frontend and/or to handle script failures in a robust way.

FIG. 8 describes a data processing pipeline. The data processing pipeline may containing a number of data sources and functional operators. Data transitioning through the data processing pipeline may comprise at least one of event information, user information, aggregator information and iterator information.

The following may correspond generally to the event and script stream of FIG. 9. Data source ID=3, with a source based on job deployment may provide data to Operator ID=4. Operator ID=4, handles at least one of timestamps and watermarks. Operator ID=4 may output data to Operator ID=5. Operator ID=5 may receive data from Operator ID=4. Operator ID=5 handles read processors. Data Source ID=1 with a source based on event data may output data to Operator ID=2. Operator ID=2 wraps events. Data source ID=−1 provides an iteration source which may be used, for example, for counting purposes.

Operator ID=9 executes event processors. This may correspond to block 915 of FIG. 9. Operator ID=9 may receive data from at least one of Operator ID=2, Operator ID=5, and data source ID=−1. Operator ID=9 may interface with data that originated from at least one of Data source ID=1, Data source ID=3, and data source ID=−1. Operator ID=9 may provide a data output. Operator ID=9 may pass data to at least one of Operator ID=10 and Operator ID=11.

FOperator ID=10 may filter processor information. That is to say Operator ID=10 may selectively pass information forward in the data processing pipeline, based upon filtering criteria. The filtering criteria of Operator ID=10 may be a predetermined function. Operator ID=10 may provide data to at least one of Operator ID=34 and Operator ID=43. Operator ID=34 may filter failures. More specifically, Operator ID=34 may be used to determine errors that have occurred during the data processing in the data processing pipeline. Operator ID=34 may provide a data output. Operator ID=39 may receive data from at least one of Operator ID=34 and Operator ID=37. Operator ID=39 may operate on deployment information. Operator ID=39 may provide an output. Data Sink ID=−2 may provide an iteration sink. Data Sink ID=−2 may receive data from Operator ID=39. Operator ID=11 may receive data from Operator ID=9. Operator ID=11 may filter data, for example it may filter BEA data. Operator ID=11 may provide data to at least one of Operator ID=15, Operator ID=28, Operator ID=32, and Data Sink ID=26. Operator ID=15 may provide aggregation. More specifically, Operator ID=15 may provide a bucket aggregator. Operator ID=28 may provide a file output. Operator ID=28 may provide a file output to Operator ID=43, wherein the file output data may contain at least event data, such as transaction data. Operator ID=32 may provide an output. Data Sink ID=26 may provide an output. Operator ID=15 may provide data to Operator ID=36. Operator ID=356 may provide aggregates per second. Operator ID=15 may provide data to Operator ID=31. Operator ID=31 may provide an aggregator output. Operator ID=15 may provide data to Operator ID=28. Operator ID=15 may provide data to Operator ID=32. Operator ID=15 may provide data to Data Sink ID=26. Operator ID=36 may provide data to Operator ID=37. Operator ID=37 may provide an indicator if the value of AggregatesPerSec is too large. Operator ID=37 may fail if the number of Aggregations per second is too large. Operator ID=43 may receive data from at least one of Operator ID=37, Operator ID=31, Operator ID=28, and Operator ID=32. Operator ID=43 may create job information. Data Sink ID=44 may push to frontend. More specifically, Data Sink ID=44 may provide Sink: Push to frontend. Data Sink ID=44 may receive data from Operator ID=43. The main processing operator (Execute EventProcessor) is configured to output two type of events: actual processing events generated by the scripts; and job information about deployment/failures and so on.

Information about the errors in the scripts may be shown on the web front-end for easier debugging Output handling may happen in flat map operators which forward newly created File/Table/information to the web frontend.

Iterative streams may be used to propagate job failures from one subtask to another.

The number of events each script sends to the outputs is monitored. The scripts that generate too many events are failed to avoid crashing the system.

A communication protocol may be used between the web interface and the job to decouple the two systems. The communication protocol may be any suitable communication protocol or message brokering communication protocol.

RBEA provides a tool that can be used to do complex event processing on the live streams, easily, without having to have knowledge of operational details.

RBEA scripts may be managed and executed in a runtime approach where events and script deployments are handled by single stream processing job that takes care of both processing (script execution) and the life-cycle management of the deployed scripts.

In some embodiments, event data may be collected for a computer implemented game being played on a user device. Event data may comprise data relating to something (event) which has occurred such as a level has been completed, the player has started playing the game, a particular booster has been used or the like. The event data may also comprise associated information such as a user identity, a device entity, a location of the user, the game being played and/or the like. The event data may comprise contextual information about the game at the point at which the event occurred such as how much life a player has left when the event occurs or the like. The event data which is collected may comprise any one or more of the above data and/or any other suitable data.

The code when run will based in input data provide an output for the required query. The code may be run on one or more processors in conjunction with one or more memories. The code may be run on the same at least one apparatus which provides the processing and/or or on at least one different apparatus. The apparatus may be at least one server or the like.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, and/or CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method of providing real time stream analytics on a live data stream of events, comprising:
receiving, at a backend computer apparatus, a first stream of a plurality of first sets of computer game data resulting from a plurality of different users playing a computer implemented game on respective computer devices, each first set of computer game data associated with one of the plurality of users and comprising an identifier associated with the one of the plurality of users and information about one or more respective events occurring in the computer implemented game played by the one of the plurality of users, wherein different first sets of computer game data have information about different types of events occurring in the computer implemented game and different first sets of data being associated with different ones of the plurality of different users;

storing in a data store for a respective identifier associated with a respective one of the plurality of users, information about at least one first event type associated with the respective identifier as state for the respective identifier, said state being valid for a plurality of subsequent first sets of computer game data associated with the respective identifier until information about one or more subsequent events for updating said state is received;

running a script for the respective identifier, wherein the script is configured to retrieve and use the state for the respective identifier stored in said data store and information about at least one respective second event type, the information about the at least one respective second event type being received in or more of the first sets of computer game data and associated with the same identifier as the respective state, the information about the first and second event types being received in different sets of the first sets of computer game data which comprise the respective identifier, wherein the script is configured to generate second sets of data comprising for a respective identifier information about the respective state and information about the respective second event type; and outputting a second stream to an aggregator of events, the second stream comprising said second sets of data, said aggregator configured to aggregate data associated with the same second event type received in different ones of said second sets of data associated with respective different users.

2. The method as claimed in claim 1, comprising processing said information about said at least one first event type and storing said processed information in said store as state.

3. The method as claimed in claim 1, comprising receiving information about one or more subsequent events for updating said stored state and storing an updated state, said updated state being used by said script.

4. The method as claimed in claim 1, comprising receiving information about one or more subsequent events for updating said stored state and associated with the respective identifier, retrieving the stored at least one state associated with the respective identifier, using the stored state and the received information about one or more subsequent events to determine updated state for the respective identifier and storing for said respective identifier said updated state for use by said script.

5. The method as claimed in claim 1, comprising receiving said first stream of said plurality of first sets of computer game data from a plurality of different devices associated with respective different users.

6. The method as claimed in claim 1, comprising running a plurality of different scripts, where the same state for a respective identifier is used by two different ones of the plurality of different scripts for the respective identifier.

7. The method as claimed in claim 6, comprising subsequently receiving at least one further script while the plurality of different scripts is running and running said at least one further script in addition to said plurality of different scripts.

8. The method as claimed in claim 7, comprising determining when information about at least one further state is to be stored for said at least one further script, and storing for each identifier information about said at least one further state.

9. A backend computer apparatus configured to perform real time stream analytics on a live data stream of events, said computer apparatus comprising at least one processor and at least one memory including computer code for one or more programs, the at least one memory and the computer code configured, with the at least one processor, to cause the apparatus at least to:

receive a first stream of a plurality of first sets of computer game data resulting from a plurality of different users playing a computer implemented game on respective computer devices, each first set of computer game data associated with one or the plurality of users and comprising an identifier associated with the one of the plurality of users and information about one or more respective events occurring in the computer implemented game played by the one of the plurality of users, different first sets of computer game data having information about different types of events occurring in the computer implemented game and different first sets of data being associated with different ones of the plurality of different users;

store, in a data store, for a respective identifier associated with a respective one of the plurality of users, information about at least one first event type associated with the respective identifier as state for the respective identifier, said state being valid for a plurality of subsequent first sets of computer game data associated with the respective identifier until information about one or more subsequent events for updating said state is received;

run a script for the respective identifier, wherein the script is configured to retrieve and use the state for the respective identifier stored in the data store and information about at least one respective second event type, the information about the at least one respective second event type being received in one or more of the first sets of computer game data and associated with the same identifier as the respective state, the information about the first and second event types being received in different sets of the first sets of computer game data which comprise the respective identifier, wherein the script is configured to generate second sets of data comprising for a respective identifier information about the respective state and information about the respective second event type; and output a second stream to an aggregator of events, the second stream comprising said second sets of data, said aggregator configured to aggregate data received in different ones of said second sets of data associated with respective different users.

10. The computer apparatus as claimed in claim 9, wherein the at least one memory and the computer code are configured, with the at least one processor, to cause the apparatus to process said information about said at least one first event type and store said processed information in said store as state.

11. The computer apparatus as claimed in claim 9, wherein the at least one memory and the computer code are configured, with the at least one processor, to cause the apparatus to receive information about one or more subsequent events for updating said stored state and store an updated state, said updated state being used by said script.

12. The computer apparatus as claimed in claim 9, wherein the at least one memory and the computer code are configured, with the at least one processor, to cause the apparatus to receive information about one or more subsequent events for updating said stored state and associated with the respective identifier, retrieve the stored at least one state associated with the respective identifier, use the stored state and the received information about one or more subsequent events to determine updated state for the respective identifier, and store for said respective identifier said updated state for use by said script.

13. The computer apparatus as claimed in claim 9, wherein the at least one memory and the computer code are configured, with the at least one processor, to cause the apparatus to receive said first stream of said plurality of first sets of computer game data from a plurality of different devices associated with respective different users.

14. The computer apparatus as claimed in claim 9, wherein the at least one memory and the computer code are configured, with the at least one processor, to cause the apparatus to run a plurality of different scripts, where the same state for a respective identifier is used by two different ones of the plurality of different scripts for the respective identifier.

15. The computer apparatus as claimed in claim 14, wherein the at least one memory and the computer code are configured, with the at least one processor, to cause the apparatus to subsequently receive at least one further script while the plurality of different scripts is running and running said at least one further script in addition to said plurality of different scripts.

16. The computer apparatus as claimed in claim 15, wherein the at least one memory and the computer code are configured, with the at least one processor, to cause the apparatus to determine when information about at least one further state is to be stored for said at least one further script, storing for each identifier information about said at least one further state.

17. A non-transitory computer readable medium encoded with instructions for controlling a backend computer apparatus, in which the instructions when executed on a processor enable the processor to execute a real time stream analytics method on a live data stream of event, comprising the steps of:

receiving a first stream of a plurality of first sets of computer game data resulting from a plurality of different users playing a computer implemented game on respective computer devices, each first set of computer game data associated with one of the plurality of users and comprising an identifier associated with the one of the plurality of users and information about one or more events occurring in the computer implemented game played by the one of the plurality of users, wherein different first sets of computer game data have information about different types of events occurring in the computer implemented game and different first sets of data being associated with different ones of the plurality of different users;

storing in a data store for a respective identifier associated with a respective one of the plurality of users, information about at least one first event type associated with the respective identifier as state for the respective identifier, said state being valid for a plurality of subsequent first sets of computer game data associated with the respective identifier until information about one or more subsequent events for updating said state is received;

run a script for the respective identifier, wherein the script is configured to retrieve and use the state for the respective identifier stored in the data store and information about at least one respective second event type, the information about the at least one respective second event type being received in one or more of the first sets of computer game data with the same identifier as the respective state, the information about the first and second event types received in different sets of the first sets of computer game data which comprise the respective identifier, wherein the script is configured to generate second sets of data comprising for a respective identifier information about the respective state and information about the respective second event type; and outputting a second stream to an aggregator of events, the second stream comprising said second sets of data, said aggregator configured to aggregate data associated with the same second event type received in different ones of said second sets of data associated with respective different users.

\* \* \* \* \*